(12) United States Patent
Ionescu

(10) Patent No.: US 8,655,860 B2
(45) Date of Patent: Feb. 18, 2014

(54) IDENTIFYING UNIVERSAL RESOURCE LOCATOR REWRITING RULES

(75) Inventor: Paul Ionescu, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/433,717

(22) Filed: Mar. 29, 2012

(65) Prior Publication Data

US 2012/0185459 A1 Jul. 19, 2012

Related U.S. Application Data

(63) Continuation of application No. 13/099,887, filed on May 3, 2011, now Pat. No. 8,495,050.

(30) Foreign Application Priority Data

May 14, 2010 (CA) ..................................... 2702351

(51) Int. Cl.
*G06F 17/30* (2006.01)
*G06F 7/00* (2006.01)
(52) U.S. Cl.
USPC ............ 707/706; 707/709; 709/224; 709/233

(58) Field of Classification Search
None
See application file for complete search history.

(56) References Cited

U.S. PATENT DOCUMENTS

| 6,928,544 | B2 | 8/2005 | Chu | |
|---|---|---|---|---|
| 2002/0116640 | A1 | 8/2002 | Chu | |
| 2008/0281899 | A1* | 11/2008 | Chan et al. | 709/201 |
| 2009/0259744 | A1* | 10/2009 | Kolke et al. | 709/224 |
| 2010/0077098 | A1* | 3/2010 | Fox et al. | 709/233 |

* cited by examiner

*Primary Examiner* — Angelica Ruiz
(74) *Attorney, Agent, or Firm* — Holland & Knight LLP; Brian J. Colandreo, Esq.; Jeffrey T. Placker, Esq.

(57) ABSTRACT

A computer-implemented process for identifying universal resource locator rewriting rules may receive input of universal resource locators of an application, to form received universal resource locators, may represent the received universal resource locators in a specialized graph and may apply analysis algorithms and heuristics to properties of the specialized graph. The computer-implemented process may further identify universal resource locator rewriting patterns using the specialized graph to form detected patterns and may generate rewrite rules corresponding to the detected patterns.

6 Claims, 10 Drawing Sheets

URL rewriting system
300

(Prior art)

IDENTIFYING UNIVERSAL RESOURCE LOCATOR REWRITING RULES

RELATED APPLICATIONS

The subject application is a continuation application of U.S. patent application with Ser. No. 13/099,887, filed May 3, 2011, which claims priority to Canadian Application No. 2702351, filed May 14, 2010, the entire content of both applications being incorporated by reference.

BACKGROUND OF THE INVENTION

This disclosure relates generally to universal resource locator rewriting in a data processing system and more specifically to identifying universal resource locator rewriting rules. Universal resource locator (URL) rewriting may be a web server technology used as a search engine optimization method. The technology may have evolved to a wide range of implementations. Universal resource locator rewriting may create shorter and more relevant looking aliases to replace real web application links. The component responsible for link transformation may be called a rewrite engine.

BRIEF SUMMARY OF THE INVENTION

In an embodiment, a computer-implemented process for identifying universal resource locator rewriting rules may, via one or more computing devices, receive input of universal resource locators of an application, to form received universal resource locators, may represent the received universal resource locators in a specialized graph and may apply analysis algorithms and heuristics to properties of the specialized graph. The computer-implemented process may further identify universal resource locator rewriting patterns using the specialized graph to form detected patterns and may generate rewrite rules corresponding to the detected patterns.

In an embodiment, a computer program product for identifying universal resource locator rewriting rules may comprise a computer readable storage medium including computer executable program code stored thereon. The computer executable program code may comprise computer executable program code for receiving input of universal resource locators of an application, to form received universal resource locators, computer executable program code for representing the received universal resource locators in a specialized graph, computer executable program code for applying analysis algorithms and heuristics to properties of the specialized graph, computer executable program code for identifying universal resource locator rewriting patterns using the specialized graph to form detected patterns and computer executable program code for generating rewrite rules corresponding to the detected patterns.

In an embodiment, an apparatus for identifying universal resource locator rewriting rules may comprise a communications fabric, a memory connected to the communications fabric, wherein the memory may include computer executable program code, a communications unit connected to the communications fabric, an input/output unit connected to the communications fabric, a display connected to the communications fabric and a processor unit connected to the communications fabric. The processor unit may be configured to execute the computer executable program code to direct the apparatus to receive input of universal resource locators of an application, to form received universal resource locators, represent the received universal resource locators in a specialized graph, apply analysis algorithms and heuristics to properties of the specialized graph, identify universal resource locator rewriting patterns using the specialized graph to form detected patterns and generate rewrite rules corresponding to the detected patterns.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts

Figure 1:
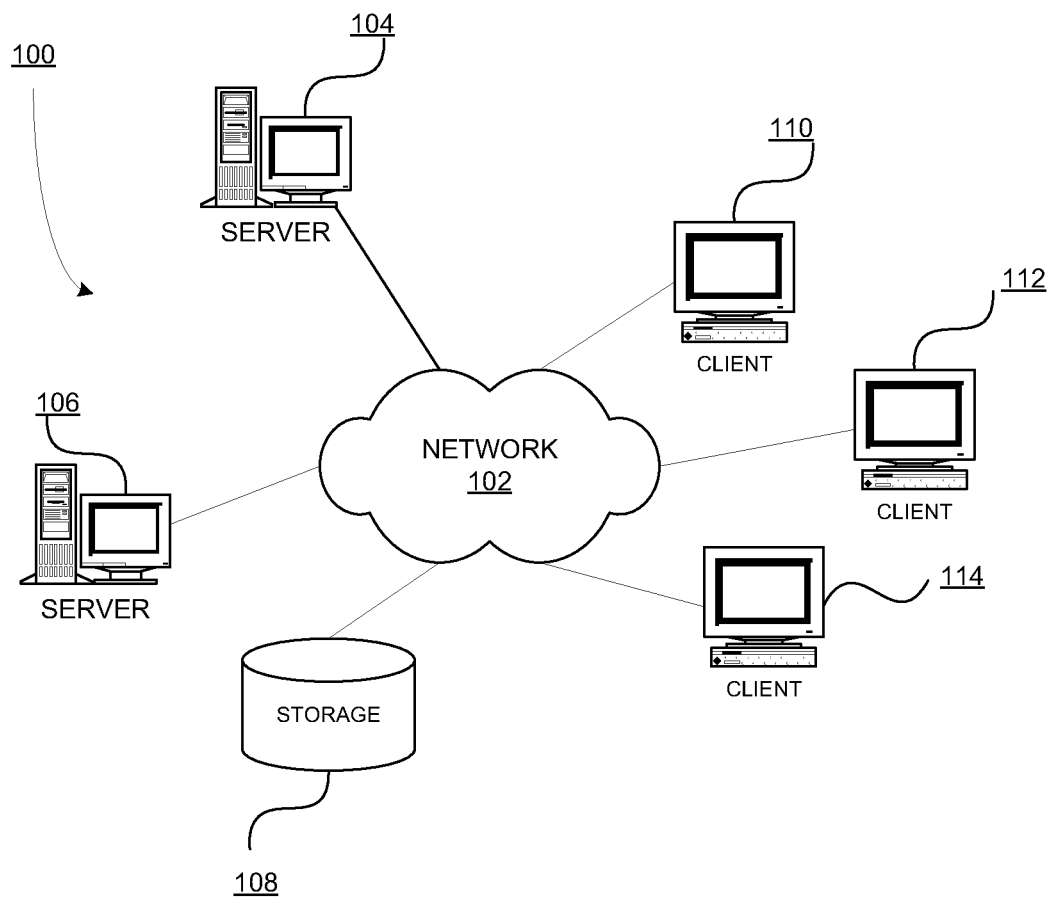
FIG. 1 is a diagram of an exemplary network data processing system operable for various embodiments of the disclosure.

It should be noted that the drawings are intended to be exemplary embodiments of the disclosure and therefore should not be considered as limiting the scope of the disclosure.

DETAILED DESCRIPTION OF THE INVENTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
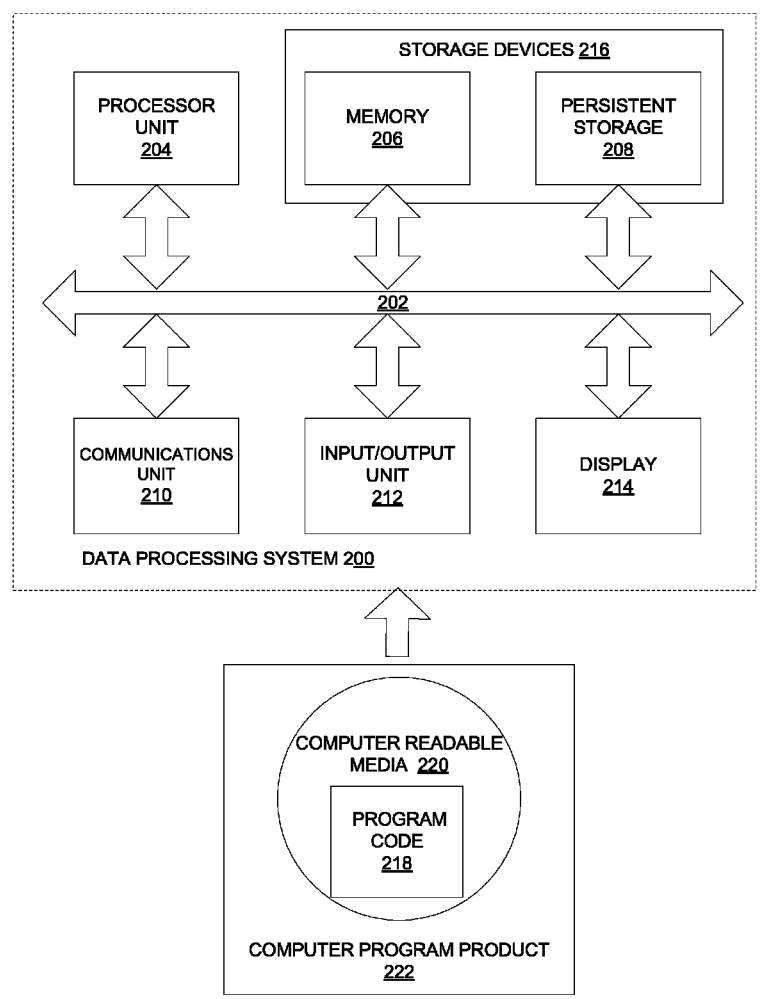
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 may be a network of computers in which the illustrative embodiments may be implemented. Network data processing system 100 may include network 102, which may be a medium used to provide communications links between various devices and computers connected together within network data processing system 100. Network 102 may include connections, such as wire, wireless communication links, or fiber optic cables.

In the depicted example, server 104 and server 106 may connect to network 102 along with storage unit 108. In addition, clients 110, 112, and 114 may connect to network 102. Clients 110, 112, and 114 may be, for example, personal computers or network computers. In the depicted example, server 104 may provide data, such as boot files, operating system images, and applications to clients 110, 112, and 114. Clients 110, 112, and 114 may be clients to server 104 in this example. Network data processing system 100 may include additional servers, clients, and other devices not shown.

In the depicted example, network data processing system 100 may be the Internet with network 102 representing a worldwide collection of networks and gateways that use the Transmission Control Protocol/Internet Protocol (TCP/IP) suite of protocols to communicate with one another. At the heart of the Internet may be a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2 a block diagram of an exemplary data processing system operable for various embodiments of the disclosure is presented. In this illustrative example, data processing system 200 may include communications fabric 202, which may provide communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system including multiple processors of the same type.

Memory 206 and persistent storage 208 may be examples of storage devices 216. A storage device may be any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may include one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, may provide for communications with other data processing systems or devices. In these examples, communications unit 210 may be a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions may be in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions may be referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 may be located in a functional form on computer readable media 220 that may be selectively removable and may be loaded onto or transferred to data processing system 200 for execution by processor unit 204. Program code 218 and computer readable media 220 may form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 may also be referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions including the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

According to an illustrative embodiment using data processing system 200 of FIG. 2 as an example, processor unit 204 may execute a computer-implemented process for identifying universal resource locator rewriting rules to receive input of universal resource locators of an application to form received universal resource locators. The exemplary computer-implemented process may be referred to as a black box process. In contrast, a white box process may begin with examining the application code and server configuration. The received universal resource locators may be provided by a Web crawler on server 104 of network data processing system 100 of FIG. 1 through network 102 of FIG. 1 and communication unit 210. Processor unit 204 may represent the received universal resource locators in a specialized graph and applies analysis algorithms and heuristics to properties of the specialized graph. The specialized graph, algorithms and heuristics may be stored in storage devices 216 or memory 206. Processor unit 204 may further identify universal resource locator rewriting patterns using the specialized graph to form detected patterns and generates rewrite rules corresponding to the detected patterns.

In an alternative embodiment, program code 218 including the computer-implemented process may be stored within computer readable media 220 as computer program product 222. In another illustrative embodiment, the process for identifying universal resource locator rewriting rules may be implemented in an apparatus comprising a communications fabric, a memory connected to the communications fabric, wherein the memory includes computer executable program code, a communications unit connected to the communications fabric, an input/output unit connected to the communications fabric, a display connected to the communications fabric, and a processor unit connected to the communications fabric. The processor unit of the apparatus may execute the computer executable program code to direct the apparatus to perform the process.

As discussed above, universal resource locator (URL) rewriting may be a web server technology primarily used as a search engine optimization method. The technology may have evolved to a wide range of implementations. Universal resource locator rewriting may create shorter and more relevant looking aliases to replace real web application links. The component responsible for link transformation may be called a rewrite engine.

A Web crawler, which also may be called a bot or a Web spider, may be a computer program that may browse the web in a methodical, automated manner. Search engines may make use of Web crawlers in the process of indexing web pages.

One of the main purposes of universal resource locator rewriting may be to prevent search engine bots from missing relevant content on dynamically generated pages. For example a bot supported by Google™ may typically ignore any parameters called id. By hiding a parameter value in a folder name, a website may prevent the search crawler from skipping the dynamically generated pages. A Web crawler may not have access to the rewrite rules of the rewrite engine. The Web crawler may view a target application as a black box.

A Web application security scanner (WASS) may be a computer program that when executed may attempt to find security vulnerabilities in a Web application. A Web application security scanner may include a Web crawler component used in the discovery of Web pages. The Web application security scanner may not need to scan all of the content but the scanner may need to scan the entire functionality of a Web application.

Content coverage may differ from functionality coverage. When a Web crawler scans a web site with the intent of reading and inventorying all text available, the Web crawler may need to acquire maximum content coverage. When a Web Crawler scans a web site with the intent of discovering all services and features available, then the Web crawler may need to acquire maximum functionality coverage.

Parameter manipulation may be a major aspect of security testing. Manipulation of parameter values may be performed to exploit the application logic of the Web application. Universal resource locator rewriting may have a somewhat protective effect on the application by hiding the parameters of the query string.

A Web crawler may typically represent universal resource locators of a Web application internally in the form of a tree. A universal resource locator path may usually refer to the string between the host name and the query string. Conventionally the path of a universal resource locator may represent the actual file structure of the web site. Universal resource locator rewriting may change an alias used for a resource link to an actual link used by the Web application. When rewriting, directories or file names may be mapped to parameter values or names. Universal resource locators rewriting constructions may also introduce new separators for path elements.

When no limits are set, Web crawlers may be trapped in infinite loops by universal resource locators rewriting aliases. For example, in a case where a session identifier B12sA3012Kssq is stored in a folder name, such as, http://a.com/b/B12sA3012Kssq/c. Session identifiers may be randomly generated values that keep changing, in some cases with every page reload. The Web crawler may be unable to identify the random value in the path may not be a real folder and there may be an infinite number of such universal resource locators.

Universal resource locator rewriting may be intended to force Web crawlers to achieve maximum content coverage. In contrast a Web application security scanner may need to achieve maximum functionality coverage. By enforcing content coverage universal resource locator rewriting may cause the Web application security scanner to unnecessarily revisit the same functionality multiple times, which may adversely affects performance.

Figure 3:
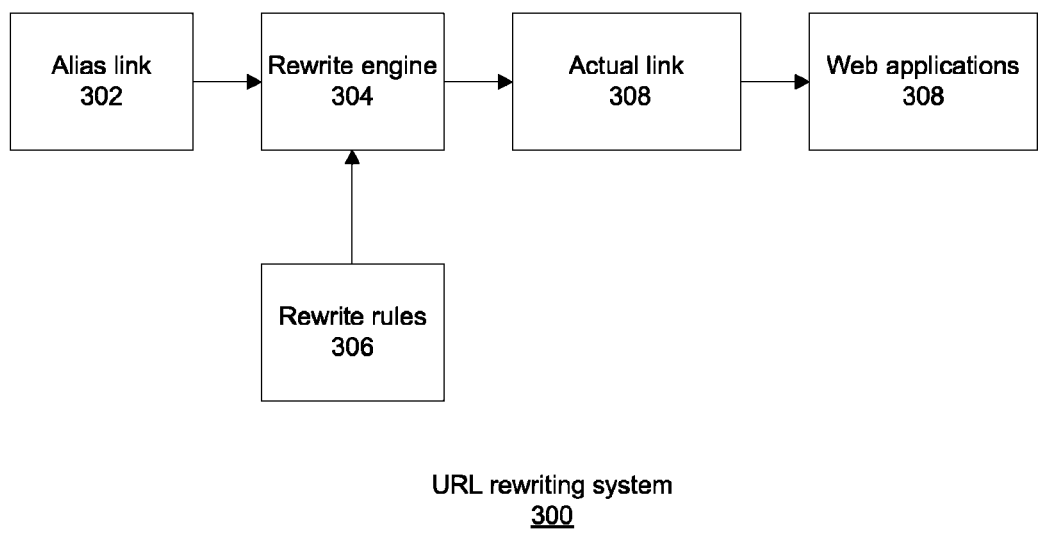
FIG. 3 is a block diagram of a universal resource locator rewriting system.

With reference to FIG. 3, a block diagram of a universal resource locator rewriting system may be presented. Universal resource locator rewriting system 300 may be an example of a current universal resource locator rewriting system.

Universal resource locator rewriting system 300 may comprise a number of system components including alias link 302, rewrite engine 304, rewrite rules 306, generated link 308 and Web applications 310. Other components, not shown, but found within a typical data processing system such as network data processing system 100 of FIG. 1 or data processing system 200 of FIG. 2 may provide support for the components of universal resource locator rewriting system 300.

Universal resource locator rewriting system 300 may use alias link 302 to present a user-friendly address representation of actual link 308 to users. Rewrite engine 304 may perform transforms between alias link 302 and actual link 308 using rewrite rules 306. The actual links may be used by Web applications.

Figure 4:
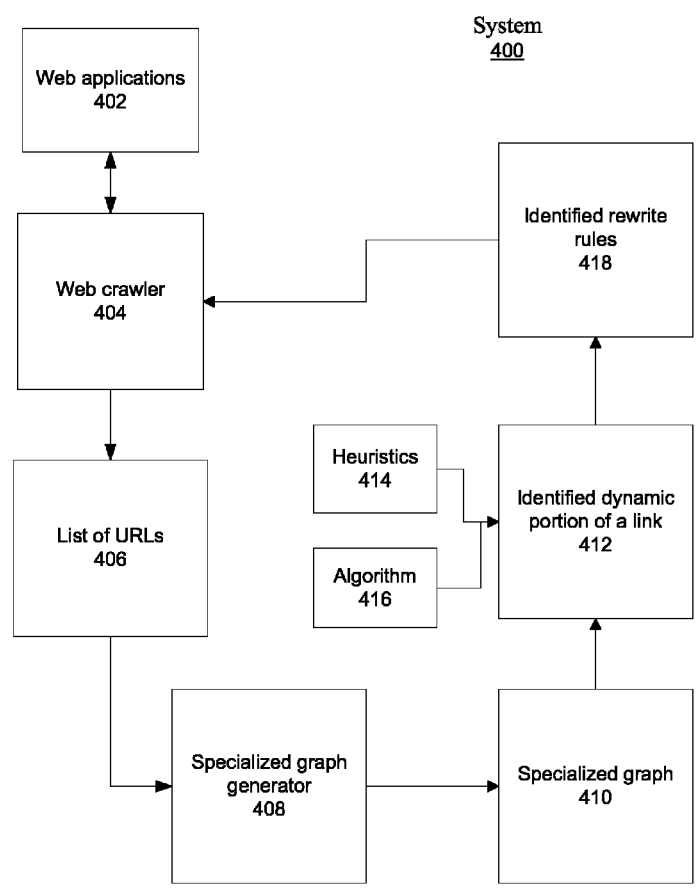
FIG. 4 is a block diagram of a universal resource locator rewrite identification system, in accordance with an embodiment of the disclosure.

With reference to FIG. 4 a block diagram of a universal resource locator rewrite identification system, in accordance with one embodiment of the disclosure is presented. System 400 may be an example of a system used to identify rewrite rules used in universal resource locator rewrite systems such as, universal resource locator rewrite system 300 of FIG. 3.

System 400 may provide a capability for identifying universal resource locator rewrite patterns for a list of universal resource locators provided by a Web crawler using a representation of the application universal resource locators in the form of a graph with special characteristics called universal resource locator optimization graph.

System 400 further may apply an algorithm and a series of heuristics to properties of the graph to identify universal resource locator rewrite patterns. Output of system 400 may produce rewrite rules in the form of regular expressions that may be communicated to the Web crawler to allow the proper handling of universal resource locator rewriting, in particular to address security issues.

System 400 may include access to a set of Web applications such as Web applications 402 from which Web crawler 404 extracts link information. The extracted link information may comprise list of universal resource locators (URLs) 406. Universal resource locators 406 may be provided as input to specialized graph generator 408 to produce specialized graph 410. Using specialized graph 410, identified dynamic portions of a link 412 may be created. Heuristics 414 and algorithm 416 may be applied to identified dynamic portions of a link 412 producing identified rewrite rules 418, which may then be used by Web crawler 404.

Figure 5:
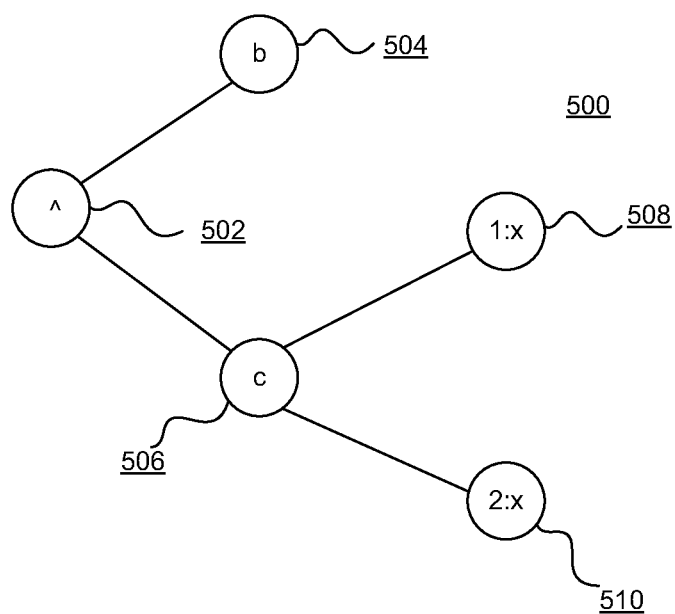
FIG. 5 is a block diagram of control flow graphs used with the universal resource locator rewrite identification system of FIG. 4, in accordance with an embodiment of the disclosure.

With reference to FIG. 5 a block diagram of a control flow graph which may be used with the universal resource locator rewrite identification system of FIG. 4, in accordance with one embodiment of the disclosure are presented.

A list of universal resource locators may be represented in the form of tree 500. Control flow graph and tree may be used interchangeably to refer to the same construct. The host name may be root 502 of tree 500 and path elements that follow the host may be individual leaves or branches (parents) to other path elements. The path elements may include nodes 504 and 506 that may be parent nodes as well as nodes 508 and 510 that are child nodes.

For example, using the following universal resource locator list:

--- http://host/a/b
http://host/a/c/1:x
http://host/a/c/2:x

--- root 502 of tree 500 is replaced with the "^" symbol as shown. This symbol represents a start of line in regular expression syntax. The choice of symbol will soon prove very useful because a goal of the universal resource locator rewrite identification system is a list of rewrite rules written in regular expression syntax. The list may then be written as:

---

^/a/b
^/a/c/1:x
^/a/c/2:x

--- represented in the form of tree 500 or control flow graph 500.

In conventional universal resource locator tree representation the branches may be associated with the "/" symbol of the path. In the case of universal resource locator rewriting, path delimiters may need to be extended to other symbols such as, ":" or ";". In this example, $D(D_1, D_2, \ldots D_N)$ may represent a conveniently chosen set of delimiters that are likely to occur in the separation of path elements when universal resource locator rewriting is involved. D also may include the null string. For example, in the link of http://site.com/name_directory/JohnSmith, the delimitation may be done by the fact that the first name and last name start with a capital letter.

Figure 6:
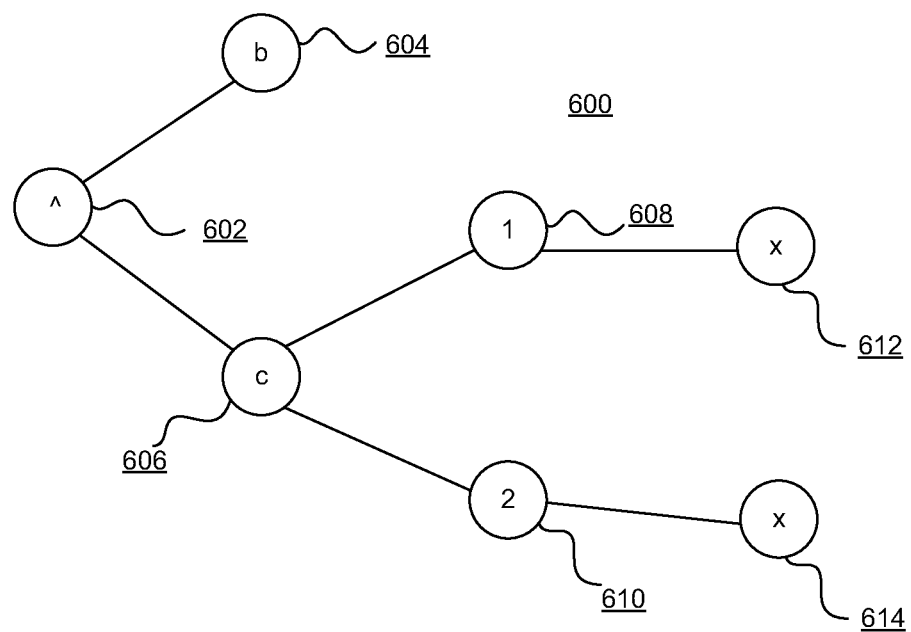
FIG. 6 is a block diagram of control flow graphs in which similar child nodes are represented as distinct nodes, in accordance with an embodiment of the disclosure.

With reference to FIG. 6 a block diagram of a control flow graph in which similar child nodes may be represented as distinct nodes, in accordance with one embodiment of the disclosure is presented.

Considering the variety of delimiters in D, the edges of the universal resource locator tree may be of various types. In this example each "x" may be represented as a distinct node of control flow graph 600. Each child node, such as node 612 and node 614 may depend from a parent node such as node 608 and node 610 respectively. Nodes 608 and 610 further depend from node 606, which may be an example of a parent node as may be node 604. Root 602 may form the basis for all parent node branches.

Continuing with the current example, let $e(e_1, e_2, \ldots e_N)$ be a sequence of various types of edges connecting two nodes of the universal resource locator tree, such as tree 600; "e" may be called an edge sequence and uniquely identifies the number and types of edges between two adjacent nodes. In the example of tree 600, the edge sequence between root 602 of tree 600 and child nodes 612 or 614 may be defined as $e\hat{}$, $X=(\text{"/","/","/",":"})$. The edge sequence may be uniquely represented as a number created from a function F (e). This number may be called edge characteristic, "c". The function F that produces the edge characteristic may be called an edge hash function. The edge hash function may be conveniently chosen so that when $F(e_{ac})$ yields the edge characteristic for two nodes, node "a" and node "c" and between node "a" and node "c" there may be a node "b", the edge hash function may be defined as $F(e_{ac})=F(e_{ab})+F(e_{bc})$. The edge characteristic between a root, such as root 602 and a child node, such as node 606 may be called a depth characteristic. The depth characteristic may uniquely identify the depth and the types of edge connecting the node to the root.

Figure 7:
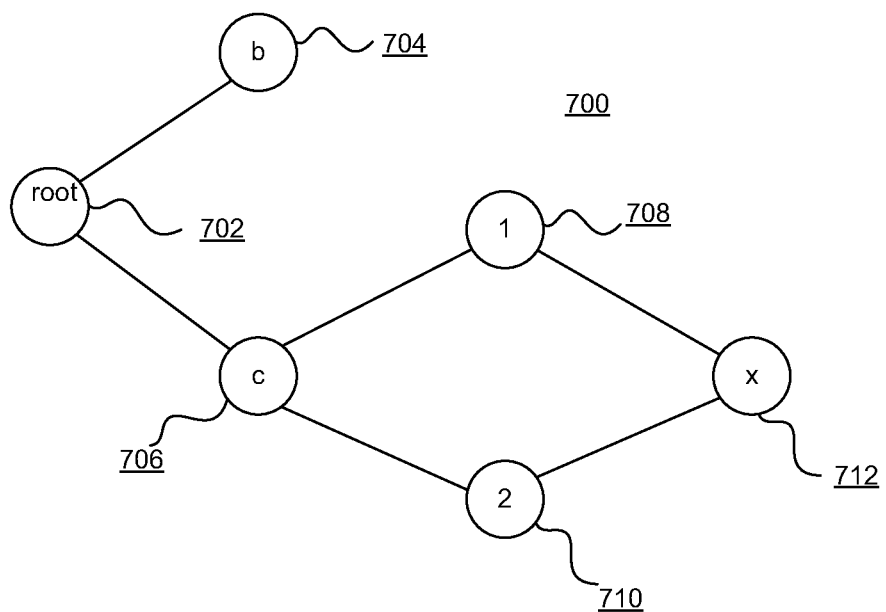
FIG. 7 is a block diagram of control flow graphs in which a common child node is represented, in accordance with an embodiment of the disclosure.

With reference to FIG. 7 a block diagram of a control flow graph in which a common child node may be represented, in accordance with one embodiment of the disclosure is presented.

Continuing with the previous example of FIG. 6, node 608 and node 610 of tree 600 of FIG. 6 each may have node 612 and node 614 respectively including an "x" as a child. Assuming that the element "x" of node 612 depending from node 608 is one and the same with the element "x" under node 610 then the universal resource locator list may be represented as tree 700. If "1:x" and "2:x" were actually two different subfolders of "c" the proposed representation may be incorrect; however this representation may be feasible for universal resource locator rewriting aliases. The graph, tree 700 that results from this form of optimization of the universal resource locator tree also saves space. Consider that in the case of universal resource locator rewriting, numeric folders in the current example may range from 1 to n, 1<n<MAXINT. In this scenario there may be a potential to save MAXINT-1 memory locations by merging the nodes including "x" values, for example, node 612 and node 614 of tree 600 of FIG. 6 now merged and represented in node 712.

The graph, such as control flow graph or tree 700, resulting from merging nodes of a universal resource locator tree that carry identical values and have the same depth characteristic may be called a universal resource locator optimization graph. The universal resource locator optimization graph may have a property that the graph is horizontally constrained. Horizontally constrained means that nodes of the optimization graph may only be connected to either the left or to the right. In the example of tree 700, root 702 may connect to node 704 and node 706, while node 706 may further connect to node 708 and node 710. Node 708 and node 710 may be connected to an end node in the form of node 712. In the following examples graphs of the same type as the universal resource locator optimization graph "O" will be referred to as universal resource locator optimization graph "O" or simply graph "O".

Nodes in the universal resource locator optimization graph "O" may be represented by a following set of properties $Oi=(v, d, L, R)$, where "v" may be the value of the node, "d" may be the depth characteristic, "L" may be the set of one or more connections to the left and "R" may be the set of one or more connections to the right. Nodes in graph "O" also may have characteristics of only connecting through one type of edge to the left, to satisfy the depth characteristic condition and connecting to the right through various types of edges. When two or more nodes of graph "O" are connected to the same node and have the same edge characteristic to that node, the two or more nodes may be called parallel nodes. In the current example node 708 and node 710 may be parallel nodes. A node of graph "O" connecting two or more parallel nodes may be called a switch.

Using the current example, node 706 labeled "c" and node 712 labeled "x" may be switches. When a group of parallel nodes, node 708 and node 710, connect to a same switch "$S_L$" to the left, such as node 706 and a same switch "$S_R$" to the right, such as node 712 the group of parallel nodes may be referred to as symmetric parallel. In the example node 708 and node 710 may be symmetric parallel.

In a general case $P(P_1, P_2, \ldots P_N)$ may be a set of parallel nodes, the number of links emitted from a switch "S", to "P" may be called switch complexity of "S for P". In the example of tree 700, node 706 labeled "c" and node 712 labeled "x" may have a switch complexity value of 2 because each switch has two links emitting from a respective node.

A path element may be called unique when the path element itself identifies a distinctive function of a web application. When a list of universal resource locators is represented in the form of a universal resource locator optimization graph, given "Q", the maximum acceptable switch complexity, "P" a set of symmetric parallel nodes and "N" and "M" the switch complexities of two switches "$S_L$" and "$S_R$" for "P"; when "N, M>Q," the path elements included in "P" may not be unique. The path elements may also most likely represent parameter values and should be treated as such. Accuracy of this statement may be directly proportional to the number of universal resource locators analyzed. Variable "Q" may be obtained through statistical methods. For example, it may be improbable that a web developer has manually created 200 numeric folders which all include a subfolder called x. Variable "Q" may be set to a high value but not so high that dynamic universal resource locators that use a smaller set of values are missed.

Figure 8:
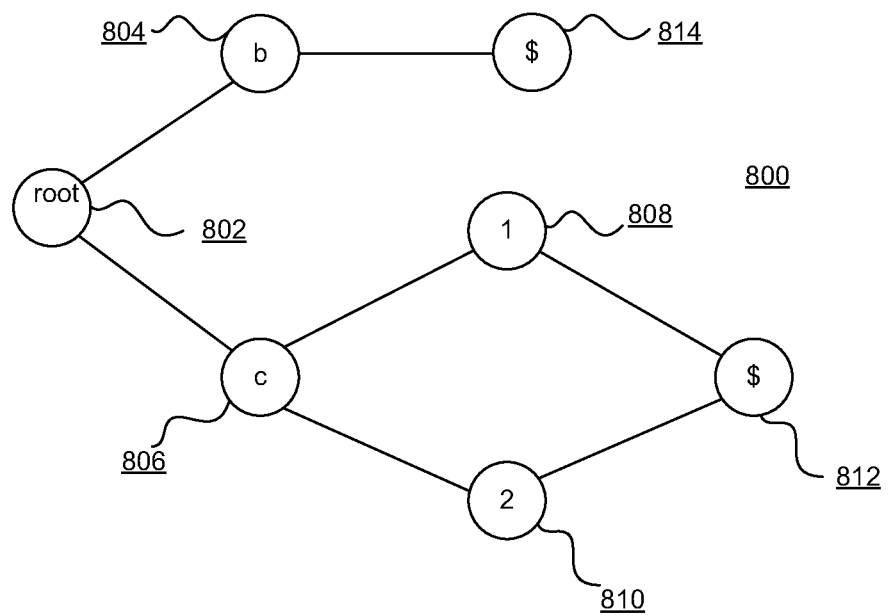
FIG. 8 is a block diagram of control flow graphs in which an end-of-line node is represented, in accordance with an embodiment of the disclosure.

With reference to FIG. 8 a block diagram of control flow graphs in which an end-of-line node may be represented, in accordance with one embodiment of the disclosure is presented.

There may be situations when the universal resource locator rewritten component may be located at the very end of a path. In that case the nodes may not be symmetric parallel since the nodes may be only connected toward the left. This case may be managed with an addition of an extra element to the end of each path in the universal resource locator list. The added element may be an end of line symbol and may be represented by the "$" symbol. The symbol may also be used in regular expression syntax.

For example the following list of universal resource locators

```
^/a/b
^/a/c/1
^/a/c/2
``` may be written as:

```
^/a/b$
^/a/c/1$
^/a/c/2$.
```

The list of universal resource locators is represented in graph 800. Node 802 through node 810 remain as before, however node 812 has been changed to the "$" symbol.

Considering the previous examples, a problem of identifying dynamic path elements may be typically reduced to a problem of finding two switches "$S_L$" and "$S_R$" with a switch complexity higher than "Q" connected to the same set of symmetric parallel nodes. The dynamic portion of the path may be identified by ($[^D_1D_2 \ldots D_N]+$) in a rewrite rule as: $S_L D_L ([^D_1 D_2 \ldots D_N]+) D_R S_R$. The term ($[^D_1D_2 \ldots D_N]+$) may be a negative enumeration of all single character delimiters. Usually a single character may represent a path delimiter and path delimiters that may be represented by more than one character may not be not included. This construction may prevent rewrite rules that are too generic from overriding other rules. For example, the expression articles/(.+?)/?$ may overwrite the expression of articles/(.+)/(.+)/index. Adding a negative enumeration may prevent a grouping from including any delimiters and reduces the risk of rule overriding.

Two switches may be connected to more than one set of symmetric parallel nodes, which may be interconnected with each other. When "$P_1$" and "$P_2$" are two distinct sets of symmetric parallel nodes both connected to two switches "$S_L$" and "$S_R$" through three delimiters of "$D_L, D_M, D_R$" then a regular expression may be written as: $S_L D_L ([^D_1 D_2 \ldots D_N]+) D_M ([^D_1 D_2 \ldots D_N] D_R S_R$.

Figure 9:
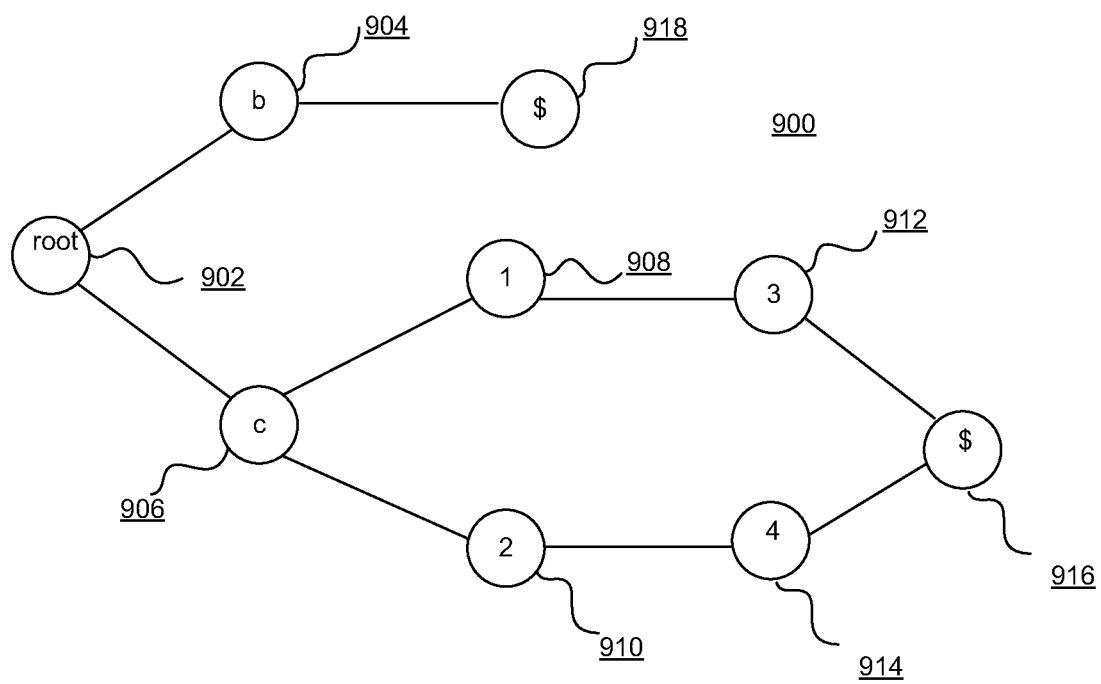
FIG. 9 is a block diagram of control flow graphs in which two sets of distinct symmetric parallel nodes connecting a same two switches is represented, in accordance with an embodiment of the disclosure.

With reference to FIG. 9 a block diagram of control flow graphs in which two sets of distinct symmetric parallel nodes connecting a same two switches may be represented, in accordance with one embodiment of the disclosure is presented.

For example, in graph 900, node 908 labeled "1", node 910 labeled "2" and node 912 labeled "3", node 914 labeled "4" may be two sets of distinct symmetric parallel nodes connecting to the same two switches of node 906 and node 916. Node B through node 918 may provide another path element in tree 900.

When two right switches "$S_{R1}$ and $S_{R2}$" with the same depth characteristic may be connected to the same set of parallel nodes the regular expression may be further optimized as $S_L D_L ([^D_1 D_2 \ldots D_N]+) D_R (?:S_{R1}|S_{R2})$.

An operation of combining two or more switches of an optimization graph, such as graph 900, which may be connected to the same switch to the left or to the right, may be known as rewrite rule consolidation. Rewrite rule consolidation may be further optimized by not anchoring a regular expression (regex) to the right switch value at all. Not anchoring a regular expression to the right switch value may typically improve performance and provide a capability to generate a shorter regular expression that may be typically easier to generate. The previous formula may be reduced to: $S_L D_L ([^D_1 D_2 \ldots D_N]+)$. The optimization may not be used when "$S_L$" is the start of line "^".

A heuristic assumption may be made that when in a pair of switches the left switch has a complexity "$C_L$" higher than "Q" but the right switch has the complexity "$C_R$" less than "Q" a probability that the two switches may still form an accurate rewrite rule may still be high provided "Cr>=Q-m", where "m" is a conventionally chosen confidence margin. The accuracy of the heuristic may be increased when a condition that the complexity of the left switch must be distributed between the switches at the right is required.

Another aspect of rewrite rule consolidation may involve merging rules to the left. Rules may be merged to the left to address situations where the left switch may also be a dynamic value but does not yield a switch complexity high enough to be detected. For example, in the list of universal resource locators:

```
^/site/appliances/ony/
^/site/appliances/oshiba/
...
^/site/computers/ony/
^/site/computers/oshiba/
```

In this case appliances and computers may be dynamic values but do attain a required switch complexity. Without merging rules to the left the following rewrite rules may be produced:

```
appliances/([^/]+)
computers/([^/]+).
```

Notice that the two rules may follow the same pattern. The action of merging rules to the left may combine sets of rules that follow the same pattern by setting a leftmost node of the set as a switch. In the example the rules may be combined as follows:

```
site/([^/]+)/([^/]+)
```

Note this action may result in false positives and may typically be left as a choice of the user.

End of line nodes may sometimes be attached to universal resource locators ending with a delimiter. For example, in the universal resource locator of http://site.com/a/$. In many cases such a universal resource locator may produce the same response as a variant that does not end in a "/" symbol. Using a delimiter comprising "/?" (without double quotes), with end of line nodes may avoid the problem. Use of this combination in regular expression syntax may enable a slash symbol to be present or not.

A start of line node may have a property common to all paths. With that particular property, the start of line node may be considered a switch and may present a danger of creating false positives. The probability of creating false positives may be addressed by limiting the depth of any right switch identified to form a pair with a start of line node. The depth limitation may be only counted against a number of forward slash delimiters on the path. For example, in the following universal resource locator list "x" has the same depth however only in the second case of the example may an actual folder structure be represented:

```
^a.b-c.x
^a/b/c/x.
```

A maximum depth for start of line pairs may also be obtained through statistical means and may be configurable by a user. Rewrite rules that start with a symbol "^" and end in a symbol "$" although possible may be less probable. Typically at least one static element may be located in a universal resource locator. Rules that match on the entire universal resource locator may be filtered to avoid false positives.

The process just described, may miss universal resource locator rewriting constructions using a value set smaller than "Q". For example, when "a" is always equal to a value "1" in the http://site.com/a=1/b=1, but the variable "b" ranges between a value of "1" and "Q+1" the process may find b=([^$D_1D_2 \ldots D_N$]+) but may not find a=([^$D_1D_2 \ldots D_N$]+).

Although a problem of fully testing dynamic constructions in the context of universal resource locator rewriting may be partially addressed the described process may still fully resolve a problem of redundancy.

When a universal resource locator includes many dynamic values, enough to satisfy the universal resource locator rewriting detection rule, but the values are split into small categories, there may be a risk of missing these definitions when the list of universal resource locators provided is not large enough or "Q" is set too high. This occurs because the left switch may be connected to less parallel nodes than the right switch. There may also be a risk that a rule will include static values when the only acceptable switch to the left is the start of line. Providing a sufficient quantity of universal resource locators, setting "Q" to an appropriate value or merging rewrite rules to the left may mitigate the problem. For example, using the following list of universal resource locators:

```
^/cars/MfgA/type1/info
^/cars/ MfgA /type2/info
^/cars/ MfgB /type1/info
^/cars/ MfgB /type2/info
``` when Q is set to 3 no rewrite rule may be found because although "info" has a switch complexity value of "4", cars has a switch complexity value of "2". When more than three car brands are added the correct rewrite rule may be produced as: cars/([^$D_1D_2 \ldots D_N$]+)/([^$D_1D_2 \ldots D_N$]+)/info.

Sometimes determining what is a delimiter may be difficult, especially in the case of delimiters that may be part of folder names such as symbols, -, _, ( ). The described process may also be faster when the number of known delimiters is smaller because fewer nodes may be created. The following symbols may typically have a very high probability of being universal resource locator rewriting delimiters since they may not be permitted in a folder name: \:*"< >|. Other possible delimiters may be added on a case-by-case basis. While reducing the comprehensiveness of the process, especially in the case of testing dynamic values, however the risk of false positives may be reduced. Some symbols may have a higher probability of being universal resource locator rewriting delimiters than other symbols. For example, the dot may typically be used as a separator for file extensions and may occur less frequently in folder names. Also the semicolon, colon, exclamation mark may not typically be used in file or folder names. The equal sign and ampersand typically used to separate parameter names and values may also be less likely to be found in file or folder names. The just described delimiters may be included in a default set which now becomes: \:*"< >|.;,!&=. However the hyphen and underscore may be used equally in file name syntax and as universal resource locator rewriting delimiters, while the plus sign or the percentage symbol may be used in universal resource locator encoding and most likely never in universal resource locator rewriting constructions. Adding these delimiters may be left as a choice of a user.

The universal resource locator optimization graph may be represented as an adjacency list (L). Each node may maintain a value, a depth characteristic and a list of the other nodes to which the current node may directly be connected, pointing to the memory location of the adjacent nodes. Each node may include a unique hash created from the node value and depth characteristic.

If the edge sequence is represented as follows e=($e_p$, $e_{p+1}, \ldots e_{q-1}, e_q$) p<=q, where "p" is a depth of the first node at the beginning of a sequence and "q+1" is the depth of the last node, then the edge hash function may be represented as $$F(e) = \sum_{i=p}^{q} e_i g N_D^i.$$

$N_D$ may be a number greater than or equal to the total number of defined delimiter types. For example, when $N_D$=10, e=(" ", "/", "-") and the delimiters in "e" are mapped as follows: " "→1, "/"→2, "-"→3, then F(e)=321.

Because the universal resource locator optimization graph may be horizontally constrained a connection list may be split in to a unit with connections to the right and another unit with connections to the left. Because a node may have edges of different types to the right of the node, the connection list may be further separated into delimiter specific groups. The left connection set may only include one delimiter specific group. Each connection may store information regarding the memory location of the next nodes and the type of delimiter.

Figure 10:
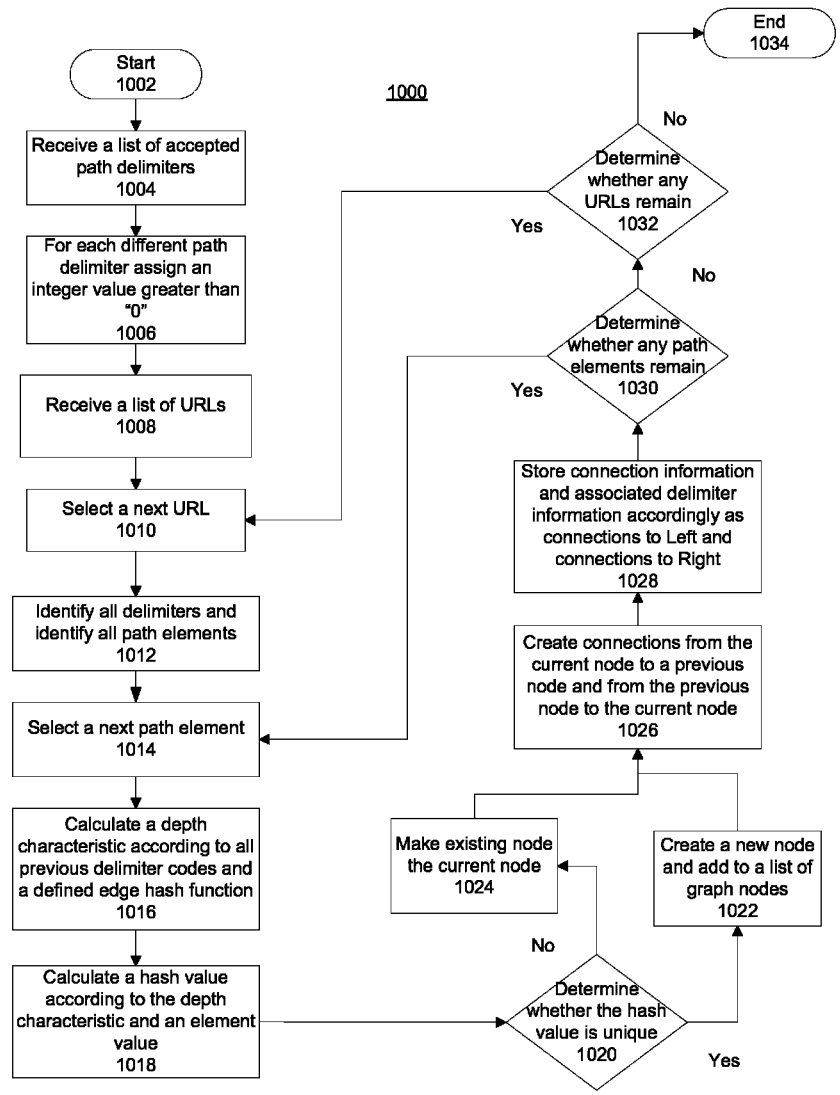
FIG. 10 is a flowchart of a process to create a control flow graph used with the universal resource locator rewrite identification system of FIG. 4, in accordance with an embodiment of the disclosure.

With reference to FIG. 10 a flowchart of a process to create a control flow graph used with the universal resource locator rewrite identification system of FIG. 4, in accordance with one embodiment of the disclosure is presented. Process 1000 may be an example of a process for preparing optimization graph information for use within universal resource locator rewrite identification system 400 of FIG. 4.

The list L may be created using process 1000. Process 1000 may start (operation 1002) and receive a list of accepted path delimiters (operation 1004). For each different, or unique, delimiter assign an integer value greater than "0" may be performed by process 1000 (operation 1006). Process 1000 may receive a list of universal resource locators (operation 1008). Process 1000 may select a next URL (operation 1010). The next URL in list L, the list of universal resource locators, may be selected, which may be a first member of the list processed after initially receiving the list. For each received universal resource locator process 1000 may identify all delimiters and may identify all path elements (operation 1012). For example, a universal resource locator may have three path elements and three delimiters as follows:

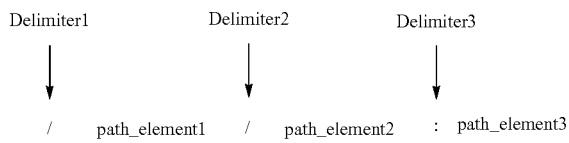

Process 1000 may select a next path element (operation 1014). The path element selected may be the first path element of the selected URL. For each path element process 1000 may calculate a depth characteristic according to all previous delimiter codes (assigned values) and a defined edge hash function (operation 1016). Process 1000 may calculate a hash according to the depth characteristic and an element value (operation 1018).

Process 1000 may determine whether the hash value (of operation 1016) is unique (operation 1020). When a determination is made that the hash is a unique value, a "yes" result may be obtained. When a determination is made that the hash is not a unique value, a "no" result may be obtained. When a "yes" result is obtained, process 1000 may add a new node to a list of graph nodes, the list L (operation 1022). When a "no" result is obtained, process 1000 may set the matching node as the current node (operation 1024). Process 1000 may create connections from the current node to the previous node and from the previous node to the current node (operation 1026). Process 1000 may store connection information and associated delimiter information accordingly as connections to the Left and connections to the Right (operation 1028).

Process 1000 may determine whether any path elements remain (operation 1030). When a determination is made that path elements remain, a "yes" result may be obtained. When a determination is made that no path elements remain, a "no" result may be obtained. When a "yes" result may be obtained process 1000 may loop back to operation 1014 to select a next path element. When a "no" result is obtained process 1000 may determine whether any URLs remain (operation 1032). When a determination is made that URLs remain, a "yes" result may be obtained. When a determination is made that no URLs remain, a "no" result may be obtained. When a "yes" result is obtained in operation 1032 process 1000 may loop back to operation 1010 to select a next URL. When a "no" result is obtained process 1000 may terminate (operation 1034).

Figure 11:
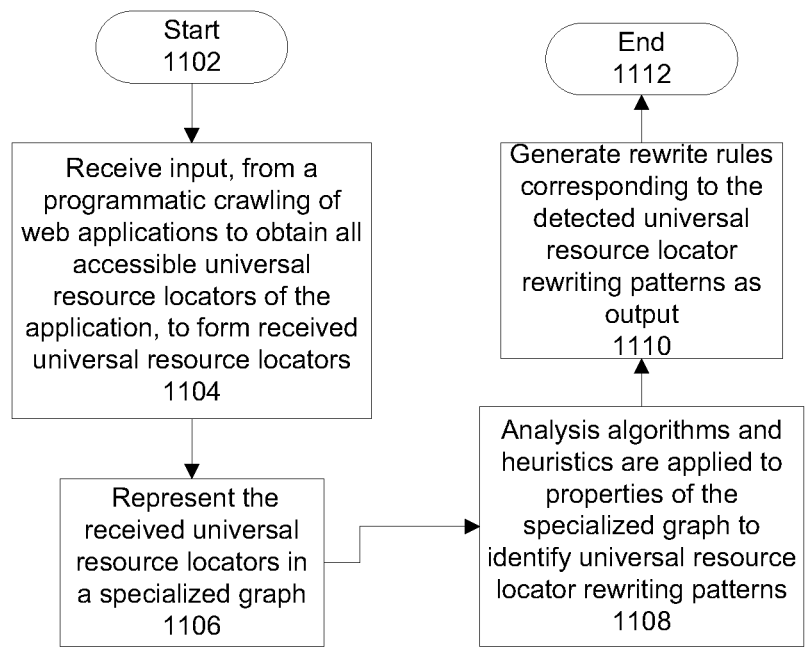
FIG. 11 is a flowchart of a high level process used with the universal resource locator rewrite identification system of FIG. 4, in accordance with an embodiment of the disclosure.

With reference to FIG. 11 a flowchart of a high level process used with the universal resource locator rewrite identification system of FIG. 4, in accordance with one embodiment of the disclosure may be presented. Process 1100 may be an example of a high level view of a process for universal rewriting identification using universal resource locator rewrite identification system 400 of FIG. 4.

Process 1100 may receive input from a programmatic crawling of web applications to obtain all accessible universal resource locators of the application to form received universal resource locators (operation 1104). Process 1100 may represent the received universal resource locators in a specialized graph (operation 1106). Analysis algorithms and heuristics may be applied, by process 1100, to properties of the specialized graph to identify universal resource locator rewriting patterns (operation 1108). Process 1100 may generate rewrite rules corresponding to the detected universal resource locator rewriting patterns as output (operation 1110) and may terminate thereafter (operation 1112).

Figure 12:
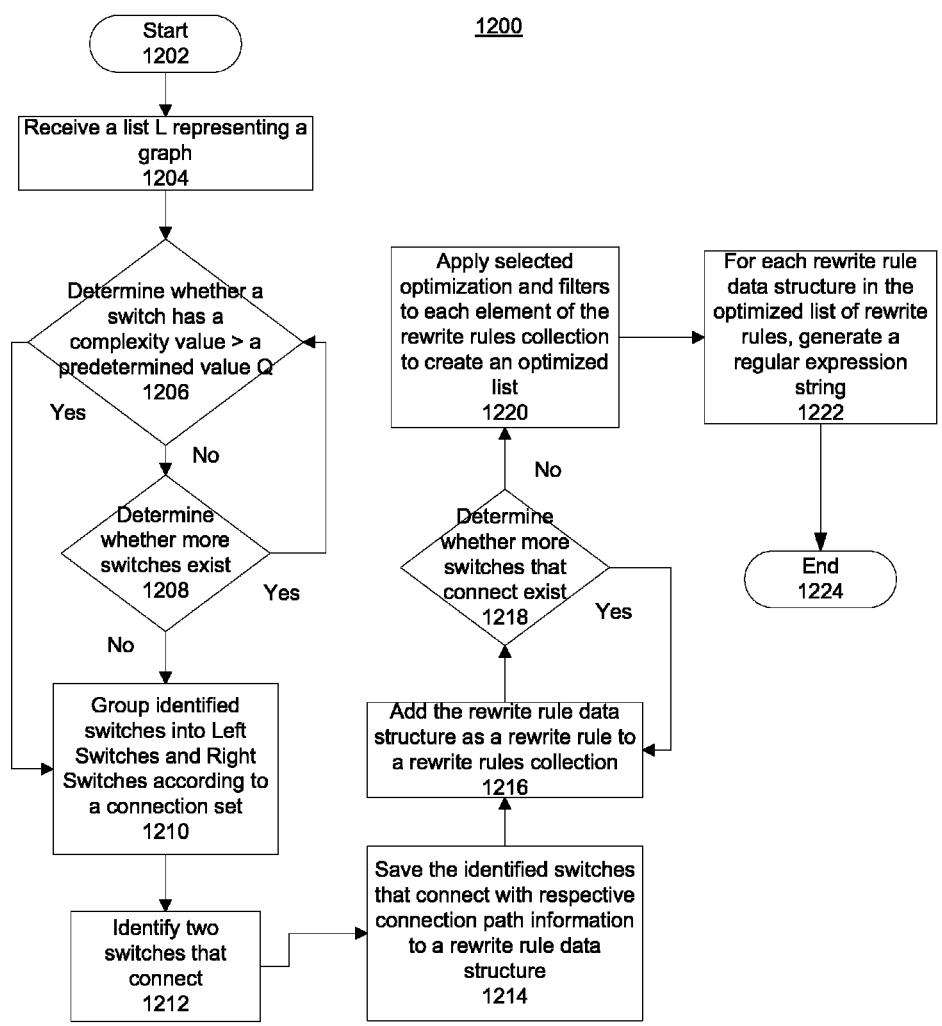
FIG. 12 is a flowchart of a detailed view of a process used with the universal resource locator rewrite identification system of FIG. 4, in accordance with an embodiment of the disclosure.

With reference to FIG. 12 a flowchart of a detailed view of a process used with the universal resource locator rewrite identification system of FIG. 4, in accordance with one embodiment of the disclosure may be presented. Process 1200 may be an example of a detailed view of process 1100 of FIG. 16.

Process 1200 may begin (operation 1202) and receive a list "L" representing the graph (operation 1204). A determination may be made as to whether a switch has a complexity value greater than a predetermined value "Q" (operation 1206). When a determination is made that a switch has a complexity value greater than a predetermined value "Q," a "yes" result may be obtained. When a determination is made that a switch does not have a complexity value greater than a predetermined value "Q," a "no" result may be obtained. When a "yes" result is obtained in operation 1206, process 1200 may skip ahead to operation 1210. When a "no" result is obtained in operation 1206, process 1200 may determine whether more switches exist (operation 1208). When a determination is made that more switches exist, a "yes" result may be obtained. When a determination is made that more switches do not exist, a "no" result may be obtained. When a "yes" result is obtained in operation 1208, process 1200 may loop back to repeat operation 1208.

When a "no" result is obtained in operation 1208, process 1200 may group identified switches into Left Switches and Right Switches according to a connection set (operation 1210). Process 1200 may identify Left and Right switches that connect to each other (operation 1212). Process 1200 may save the switches along with respective connection path information to a rewrite rules data structure (operation 1214). Process 1200 may add a rewrite rule (of the rewrite rule data structure) to a rewrite rules collection (operation 1216).

Process 1200 may determine whether more identified switches that connect exist (operation 1218). When a determination is made that more identified switches that connect exist, a "yes" result may be obtained in operation 1218. When a determination is made that more identified switches that connect do not exist, a "no" result may be obtained in operation 1218. When a "yes" result is obtained in operation 1218, process 1200 may loop back to repeat operation 1216.

When a "no" result is obtained in operation 1218, process 1200 may apply selected available optimizations and filters to each element of the rewrite rules collection to create an optimized list (operation 1220). For example, pruning of the rewrite rules may discard rules that have a potential for matching too many universal resource locators or rules may be discarded through rule consolidation. A "matching limit" may be set as a predetermined amount or number.

Process 1200 may generate a regular expression string for each rewrite rule data structure in the optimized list of rewrite rules using a formula of $S_L D_L ([^\wedge D_1 D_2 \ldots D_N]+) D_{P1}([^\wedge D_1 D_2 \ldots D_N]+) D_{P2}([^\wedge D_1 D_2 \ldots D_N]+) \ldots D_{PM}([^\wedge D_1 D_2 \ldots D_N]+)$ where $D_{Pi}$ may be the delimiters that separate nodes of the rewrite rule connection path (operation 1722). Process 1200 may terminate thereafter (operation 1224).

Thus an illustrative embodiment of a computer-implemented process for identifying universal resource locator rewriting rules may receive input of universal resource locators of an application, to form received universal resource locators, represent the received universal resource locators in a specialized graph and apply analysis algorithms and heuristics to properties of the specialized graph. The computer-implemented process further may identify universal resource locator rewriting patterns using the specialized graph to form detected patterns and generates rewrite rules corresponding to the detected patterns.

As will be appreciated by one skilled in the art, aspects of the present invention may be embodied as a system, apparatus, method or computer program product. Accordingly, and as mentioned above, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a semiconductor or solid state memory, a random access memory (RAM), a read-only memory (ROM), an erasable programmable read-only memory (EPROM or Flash memory), an optical fiber, a portable compact disc read-only memory (CD-ROM), an optical storage device, magnetic tape, a magnetic storage device, a removable computer diskette, a rigid magnetic disk, an optical disk, compact disk-read-only memory (CD-ROM), compact disk-read/write (CD-R/W), DVD or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

A computer program product and/or computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Data processing system 20, e.g. representing support server 22, suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O-devices (including, but not limited to keyboards, displays, pointing devices, etc.) may be coupled to the system either directly of through intervening I/O controllers. Network adapters may also be coupled to the system to enable the data processing system or remote printers or storage devices through intervening private or public networks. Modems, cable modem and Ethernet cards are just a few of the currently available types of network adapters.

Aspects of the present invention may be described below with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented process for identifying universal resource locator rewriting rules, the computer-implemented process comprising:
   receiving, via one or more computing devices, input of universal resource locators of an application, to form received universal resource locators;
   representing, via the one or more computing devices, the received universal resource locators in a graph;
   applying, via the one or more computing devices, analysis algorithms and heuristics to properties of the graph;
   identifying, via the one or more computing devices, universal resource locator rewriting patterns using the graph to form detected patterns, including if a switch has a complexity value greater than a predetermined value "Q", grouping identified switches into Left Switches and Right Switches according to a connection set; and
   generating, via the one or more computing devices, rewrite rules corresponding to the detected patterns.

2. The computer-implemented process of claim 1, wherein receiving input further comprises:
   receiving a set of universal resource locators, wherein the set comprises a list of universal resource locators generated by a Web crawler examination of Web sites of the application.

3. The computer-implemented process of claim 1, wherein representing the received universal resource locators in a graph further comprises:
   receiving a list of accepted path delimiters;
   assigning a respective integer value greater than zero to each different path delimiter;
   receiving a list of universal resource locators;
   selecting a next universal resource locator;
   identifying all delimiters and all path elements;
   selecting a next path element;
   calculating a depth characteristic according to all previous delimiter codes and a defined edge hash function;
   calculating a hash value according to the depth characteristic and an element value;
   determining whether the hash value is unique;
   responsive to a determination that the hash value is not unique making an existing node a current node;
   responsive to a determination that the hash value is unique creating a new node and adding the new node to a list of graph nodes;
   creating connections from the current node to a previous node and from the previous node to the current node;
   storing connection information and associated delimiter information accordingly as connections to Left and connections to Right;
   determining whether any path elements remain;
   responsive to a determination no path elements remain, determining whether any URLs remain; and
   responsive to a determination that more URLs remain, selecting a next URL.

4. The computer-implemented process of claim 1, wherein identifying universal resource locator rewriting patterns using the graph to form detected patterns further comprises:
   identifying which switches connect to each other;
   saving the switches that connect to each other along with respective connection path information to a rewrite rules data structure; and
   adding a rewrite rule of the rewrite rule data structure to a rewrite rules collection.

5. The computer-implemented process of claim 1, wherein identifying universal resource locator rewriting patterns using the graph to form detected patterns further comprises:
   responsive to determination that more switches that connect do not exist, applying selected optimization and filters to each element of a rewrite rules collection to create an optimized list.

6. The computer-implemented process of claim 1, wherein generating rewrite rules corresponding to the detected patterns further comprises:
   generating a regular expression string for each rewrite rule data structure in an optimized list of rewrite rules, wherein generating the regular expression string uses a formula of $S_L D_L([^{\wedge}D_1 D_2 \ldots D_N]+)D_{P1}([^{\wedge}D_1 D_2 \ldots D_N]+)D_{P2}([^{\wedge}D_1 D_2 \ldots D_N]+) \ldots D_{PM}([^{\wedge}D_1 D_2 \ldots D_N]+)$ where $S_L$ represents a left switch characteristic and $D_{Pi}$ are the delimiters that separate nodes of the rewrite rule connection path.

* * * * *